United States Patent [19]

Gana

[11] Patent Number: 4,806,902

[45] Date of Patent: Feb. 21, 1989

[54] FLUID LEVEL MONITOR AND FILLER ASSEMBLY

[76] Inventor: John W. Gana, 5077 Landisville Rd., Doylestown, Pa. 18901

[21] Appl. No.: 136,011

[22] Filed: Dec. 21, 1987

[51] Int. Cl.⁴ .................... B60Q 1/00; G01F 23/00
[52] U.S. Cl. ............................. 340/59; 340/623; 340/624; 73/293; 73/294; 73/322; 73/305; 116/228; 141/95; 141/331; 137/386
[58] Field of Search ............... 340/59, 52 R, 612, 618, 340/623, 624; 73/294, 322, 319, 305–308, 314, 293; 116/227, 228; 137/386, 392, 393, 396–399; 141/94, 95, 331, 339

[56] References Cited

U.S. PATENT DOCUMENTS

| 248,013 | 10/1881 | Bleyer | 73/294 |
| 994,272 | 6/1911 | Parker | 73/294 |
| 3,138,024 | 6/1964 | Pariser et al. | 73/322 |
| 3,691,839 | 9/1972 | Lasher | 73/322 |

Primary Examiner—Donnie L. Crosland
Attorney, Agent, or Firm—Joseph W. Molasky & Assocs.

[57] ABSTRACT

A monitor and filler assembly providing an easily observable reading as to the fluid level in a reservoir such as an automatic transmission or crankcase of an automobile. The filler may be integrally formed with the monitor to allow for easy replenishing of the reservoir fluid to ensure proper operation of the automobile.

17 Claims, 4 Drawing Sheets

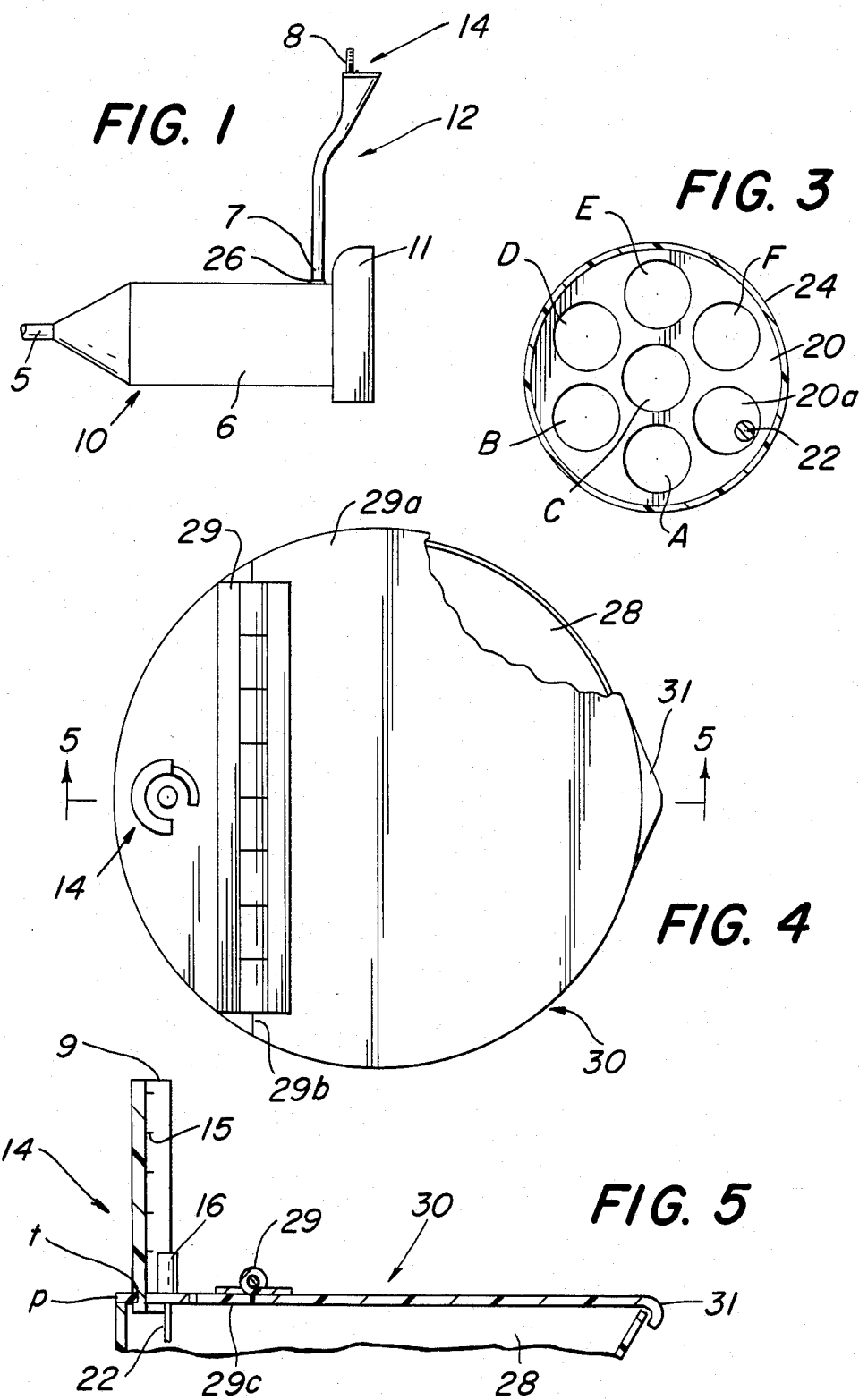

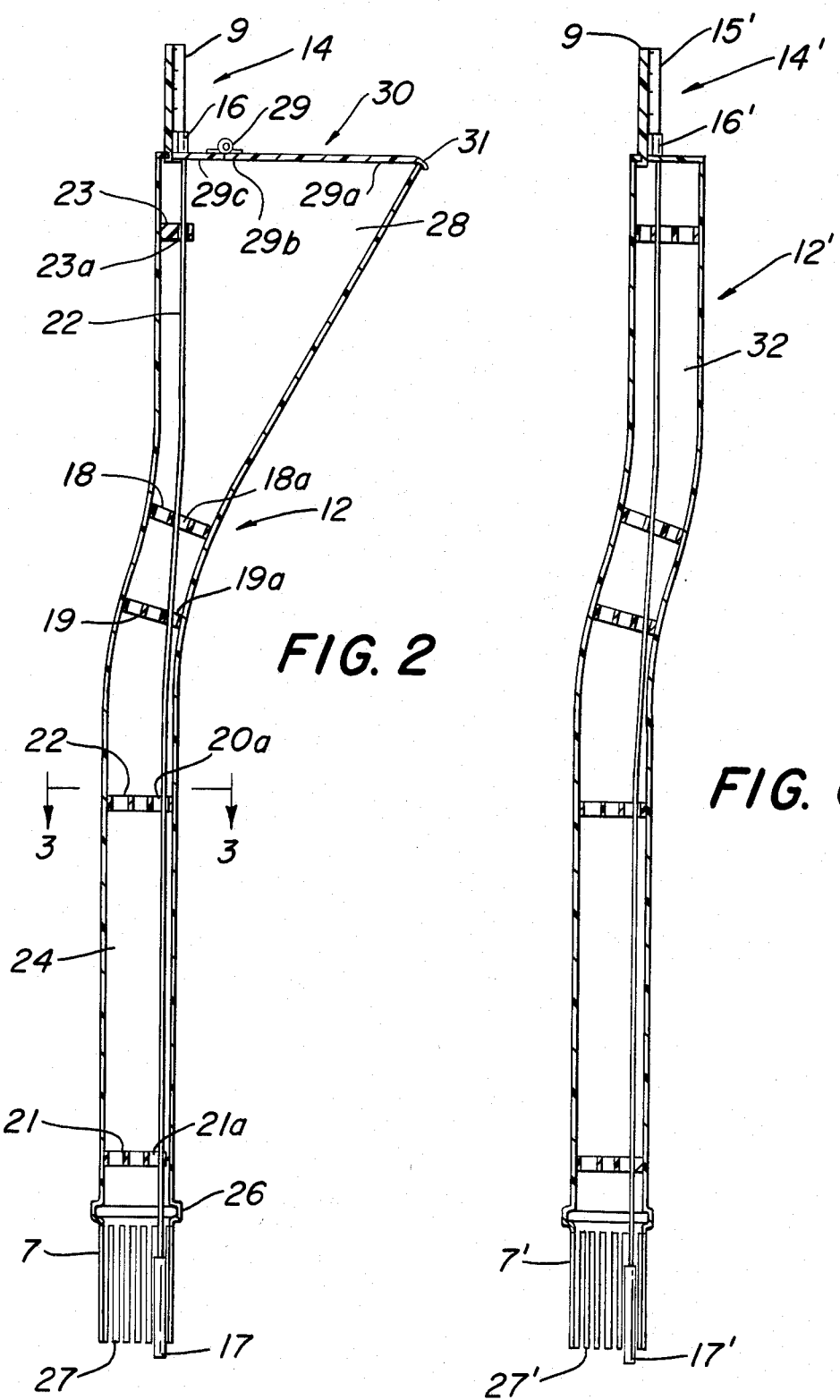

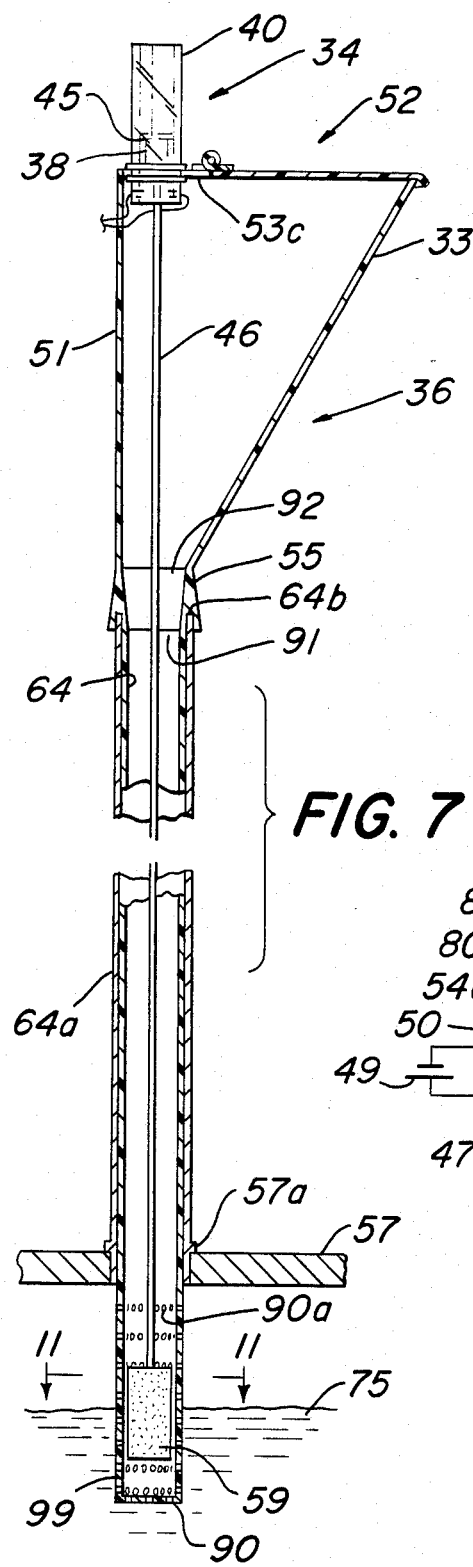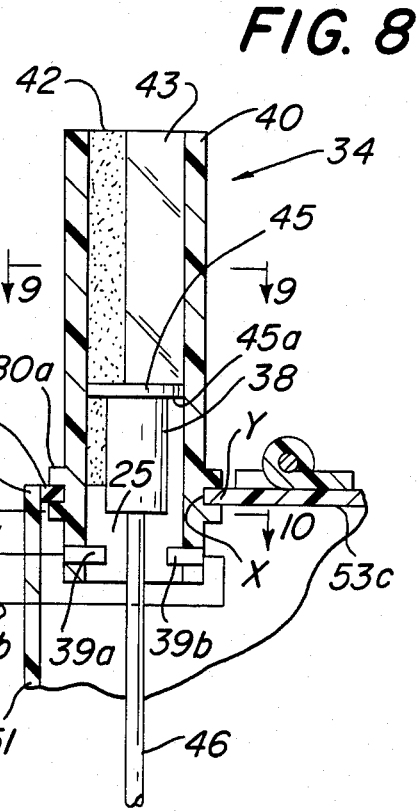

FLUID LEVEL MONITOR AND FILLER ASSEMBLY

BACKGROUND OF THE INVENTION

The present invention relates in general to the art of mechanical systems which utilize a fluid as a component part of its operation. In particular, the invention relates to a mechanical assembly for enabling an operator to properly and easily maintain the fluidic component of a mechanical system in accordance with known specifications.

In mechanical systems which employ a fluid as an essential component of its operation, the prior art has utilized various arrangements to monitor and fill a reservoir which retains the fluid. In an automobile, for example, the fluid danger level in the crankcase is monitored by a warning light on the dashboard; on the other hand, the fluid level in the automatic transmission of an automobile is normally not monitored by a warning light and, therefore, it must be manually monitored periodically. Monitoring and maintaining a reservoir at a proper level is mandatory in mechanical systems which employ a fluidic component in order to enable certain performance levels to be achieved. This is evident in automotive automatic transmissions where fluidic pumping action is utilized to provide shifting between gears. When the fluid in the transmission is not maintained at a proper level, shifting becomes sluggish and acceleration performance standards of the automobile are compromised.

The prevalence of self-service gasoline stations has made it almost mandatory for owners to monitor the fluid levels of their automobiles. However, when such monitoring must be done manually it is frequently not done at all. Similarly, when the operator is careless and is warned of impending engine overheating by the dashboard warning light, damage may have already occurred. Therefore, there is a need for an integral fluid monitoring and filling apparatus for a mechanical system that is easily observable and accessible to the operator.

The present invention has been designed to monitor and maintain the reservoir of a mechanical system in a simplified and economical manner so that adequate performance characteristics can be maintained.

SUMMARY OF THE INVENTION

The fluid level monitoring and filler assembly herein described utilizes a cylindrical filler which forms a passageway into the reservoir. A flotation device connected to a flexible and movable rod is positioned within the passageway in order to provide up and down movement in accordance with the fluid level in the reservoir. The rod together with the flotation device is attached to an indicator means for easy viewing. The indicator means comprises first and second members which are concentrically arranged such that the first member is connected to the flexible and movable rod, whereas, the second member is semi-permanently attached to the cylindrical filler. The indicator is designed to display a first color when the reservoir is in a filled condition, and the first color is contrastingly displayed with a second color when there is a partial depletion of fluid from the reservoir. The greater the first and second color contrast as shown by the indicator, the greater the depletion of fluid.

BRIEF DESCRIPTION OF THE DRAWINGS

FIG. 1 shows an elevational view of an embodiment of the invention depicting the fluid reservoir in combination with the funnel-shaped monitor and filler assembly.

FIG. 2 is a cross sectional view of the monitor and filler assembly of FIG. 1.

FIG. 3 is a cross sectional view along line 3—3 of FIG. 2.

FIG. 4 is a plan view of the monitor and filler assembly of FIG. 1.

FIG. 5 is a cross sectional view along line 5—5 of FIG. 4.

FIG. 6 is another embodiment of the invention which is shown, in cross section.

FIG. 7 illustrates another embodiment of the invention shown in cross section.

FIG. 8 is a cross sectional enlargement of the monitor assembly of this invention as shown on the top of FIG. 7.

DESCRIPTION OF THE PREFERRED EMBODIMENTS

Figure 9:
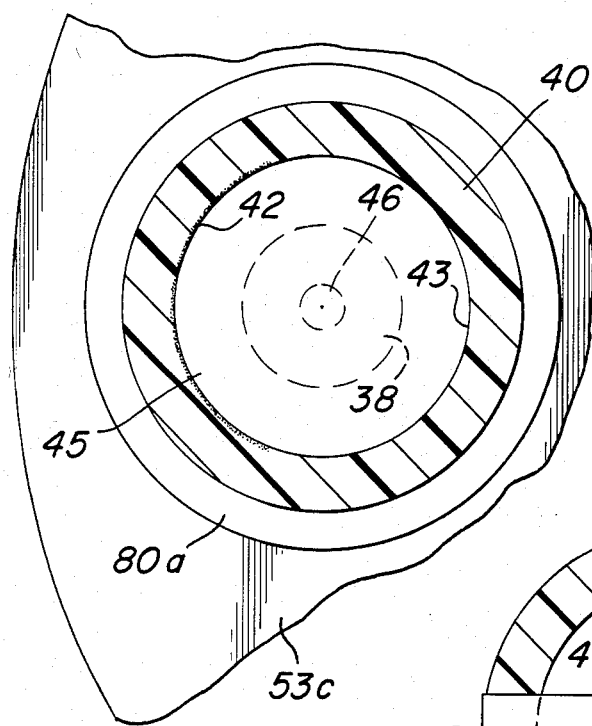
FIG. 9 depicts a sectional view along line 9—9 of FIG. 8.

Referring to FIG. 1, there is shown the filler 12 and monitor assemblies 14 of this invention being utilized to respectively maintain and ascertain the fluid level in a reservoir (not shown) within an automatic transmission 10 of an automobile. In its simplest form the transmission 10 is comprised of a longitudinal body 6 which contains various gears and pumps (not shown) for rotating a drive shaft 5 at one end, and for coupling to a crank shaft (not shown) of the automobile's engine through a bell housing 11. Fluid (not shown) within the transmission 10 enables shifting to occur between gears by means of pumping action, and maintaining a proper level within the reservoir is important to eliminate sluggish shifting performance which compromises automobile acceleration standards. The monitor assembly 14 is connected to the filler assembly 12 at its proximal end 8 and is located in the automobile's engine compartment (not shown) to a height that allows an operator to make easy eye contact when maintenance checks are being conducted; and, the filler assembly 12 is joined at the collar 26 of its distal end 7 to the transmission body 6 for allowing the fluidic component within the reservoir to be properly maintained in accordance with known specifications. In FIG. 1 the filler assembly 12 is designed with a curvature along its length dimension from the transmission connection at the distal end 7 to its proximal end 7 where the monitor assembly 14 is located to avoid certain components within the engine compartment, although it should be understood by those skilled in the art that the assembly 12 may be formed without such a curvature.

In the cross sectional view of FIG. 2, component parts of the filler assembly 12 are shown which consist of a funnel member 28 which is integrally connected with a relatively small diameter, slightly curved, vertical pipe member 24 for connection to the transmission reservoir 10 (see FIG. 1). The pipe member 24 is positioned at its distal end 7 in a transmission opening (not shown) to a depth as determined by collar 26; and below the collar 26 the pipe member 24 is formed into a plurality of flexible fingers 27 in order to allow facile insertion into the transmission opening as well as to enable fluid to readily seek its own level for proper operation of a flotation member 17. The integral arrangement of the filler assembly 12 facilitates the addition of fluid to an automatic transmission when maintenance is being done by minimizing spillage due to the wide mouth opening of the funnel member 28 which leads into a small opening provided by the pipe member 24. Positioned upon the funnel member 28 is a two-piece lid 30 consisting of a stationary portion 29c and movable portion 29a where the lid ensures that no dirt within the engine compartment can enter the transmission reservoir. Any dirt or dust which would enter the reservoir would be deleterious to the operation of the automatic transmission and eventually might cause it to become inoperative. At a junction 29b of the stationary portion 29c and movable lid portion 29a a hinge 29 is located which allows the filler assembly 12 to be readily opened by grasping the lip 31 formed on the movable portion and thrusting upwardly. The two-piece hinged lid 30 including movable portion 29a, stationary portion 29c and hinge 29 located at junction 29b is more clearly seen in the plan view of FIG. 4, in combination with monitor assembly 14.

The sectional view 5—5 of FIG. 5 illustrates how the monitor assembly 14, which consists essentially of a rotatable gauge 9 having indicia 15 in the form of fill markings 15 and a movable indicator 16 that rises or falls in accordance with the amount of fluid in the transmission reservoir, is attached to the stationary portion 29c of lid 30. The vertical travel of the indicator 16 with respect to the markings 15 is determined by a level/-volume ratio of the reservoir and enables one to read whether the latter is full or partially depleted. The gauge 9 of the monitor assembly 14 is attached to the stationary lid portion 29c by a mating of a female slot t which is formed on an exterior surface of its semi-circular cross section and a male member p arranged in stationary lid 29c. The slot p is also circular in nature and provides a two-hundred and seventy degree arc for gauge 9 as depicted in FIG. 4. Upon the mating of the complementary slots p and t the gauge 9 is able to be rotated within the two hundred and seventy degree arc for improved viewing of the fill markings 15 with respect to the indicator 16 depending upon the operator or maintenance personnel's position within the engine compartment of the automobile. The indicator 16 is directly coupled into the reservoir by means of a long, flexible rod 22 and a member 17 (see FIG. 2) which floats upon the transmission fluid. The flexible rod 22 is maintained in proper alignment for unencumbered movement by means of variously oversized openings 18a, 19a, 20a, 21a in respective periodically positioned spacers 18, 19, 20, 21 within the pipe member 24, as well as by opening 23a provided in extension means 23. By referring to FIG. 3 which is a cross sectional view 3—3 through the pipe member 24 of FIG. 2, the flexible rod 22 is shown located within the oversized opening 20a of spacer 20. Additional openings A, B, C, D, E, F are located in spacer 20 to permit fluid to readily pass into the reservoir of transmission 10 when supplied through the funnel member 28 (see FIG. 2) for maintaining a proper operating level.

Another embodiment of the invention is provided in FIG. 6 where a monitor assembly 14' is positioned upon a filler assembly 12' in the manner described with respect to the embodiment of FIGS. 2-5. However, the curved pipe member 32 of filler assembly 12' is designed with a constant diameter cross section from top to bottom unlike the embodiment of FIGS. 2-5 in order to accommodate a simpler design. The filler 12' and monitor assemblies 14' in all other respects however operate and function in the same manner as their respective counterparts in FIGS. 2-5. As previously described, the float 17' moves vertically in accordance with the fluid level in the reservoir and correspondingly causes indicator 16' to move with respect to fill markings 15' of rotatable gauge ' for determining the status of the fluid. In addition, fingers 27' are formed at the distal end 7' for ease of insertion into an opening leading into the transmission reservoir as well as for ease in allowing fluid to seek its own level within pipe member 32.

Reference is now made to FIG. 7 where still another embodiment of the invention incorporating differently operated monitor 34 and filler assemblies 36 are illustrated. The monitor assembly 34 as further seen in cross sectional detail in FIG. 8 consists of a flexible rod 46 which is attached at one end to a flotation member 59 (see FIG. 7) and at the other end to a cylindrically formed member 38, which is arranged within a second cylindrical and transparent member 40. The cylindrical member 38 incorporates on its topmost surface an additional larger cylindrical member 45 which is concentrically positioned within and for slidable engagement with the cylindrical member 40. An underside surface 45a of the larger cylindrical member 45 incorporates conductive material in order to allow passage of an electrical current for reasons that will become apparent in a later paragraph. The transparent cylindrical member 40 is subsequently formed so that a more than one-half portion 43 (see FIG. 8) as measured by its diameter retains its transparency, whereas, the remainder is made opaque by locating a colored material 42 on its inside surface. The relationship of the opaque material 42, which in a preferred embodiment is orange, with respect to the transparent portion 43 is readily seen in FIG. 9 which is a cross section view 9—9 taken through FIG. 8. In contrast, the exteriors of the cylindrical members 38, 45 are made of a second color which in the preferred embodiment is white.

With reference again to FIG. 8, there is illustrated a positioning of two separated collars 80a, 80b upon an exterior surface of the cylindrical member 40. The collars 80a, 80b are sufficiently separated from one another so as to form a circular female opening X that mates with a male extension 80c attached to a wall 51 of the filler assembly 36 as well as to a male extension Y of stationary lid 53c. The complementary arrangement of the circular female opening X with the male extensions Y and 80c allow the cylindrical member 40 to be rotated through three hundred and sixty degrees with respect to the cylindrical members 38, 45. The monitor assembly 34 functions by providing a contrasting color arrangement between the white color displayed on the exterior surface of cylinders 38, 45 with the orange color 42 located within transparent cylindrical member 40. By way of example, when the reservoir being monitored is filled the cylinders 38, 45 move to the top of member 40 and a person doing automotive maintenance is prevented from seeing the opaque orange material 42 through the transparent portion 43 of cylinder 40. Therefore, the observance of the white color only in the assembly 34 indicates a safe fluid level in the reservoir being monitored. In contrast, if the cylinders 38, 45 are as shown in FIG. 8, there will be more orange than white color being observed through the transparent section 43 indicating that there is a partial depletion of fluid from the reservoir, and therefore serves as a warning of an existence of a condition that requires immediate attention.

Figure 10:
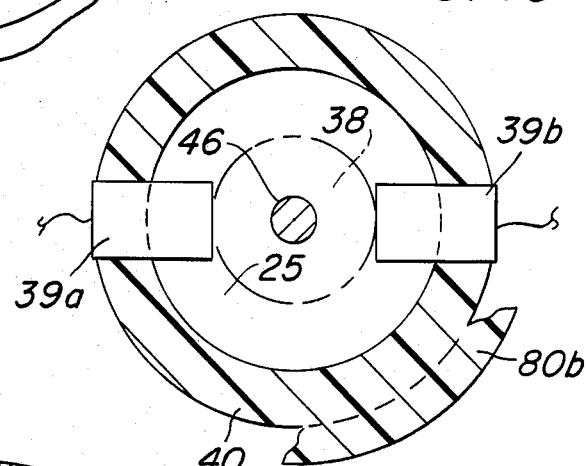
FIG. 10 is a cross sectional view along lines 10—10 of FIG. 8.

In an event that the fluid in the reservoir is dangerously depleted an electrical circuit has been devised for activating a warning light 47 to alert the operator. The warning circuit is comprised of two electrical conductors 39a, 39b that extend into an opening 25 encompassed by the cylindrical member 40 as may be seen in the sectional view 10—10 in FIG. 10; and wire leads 54a, 54b are respectively connected to contact 39a, 39b. A single pole, double throw switch 50 is connected to lead 54a and to a negative terminal of battery 49, whereas, light bulb 47 is connected to lead 54b as well as to a positive terminal of battery 49. Therefore, when the cylindrical member 38 is in a fully downward position the conductive surface 45a of cylindrical member 45 makes connection with the contacts 39a, 39b to complete the electrical circuit and cause bulb 47 to be energized through battery 49 and closed switch 50.

Figure 11:
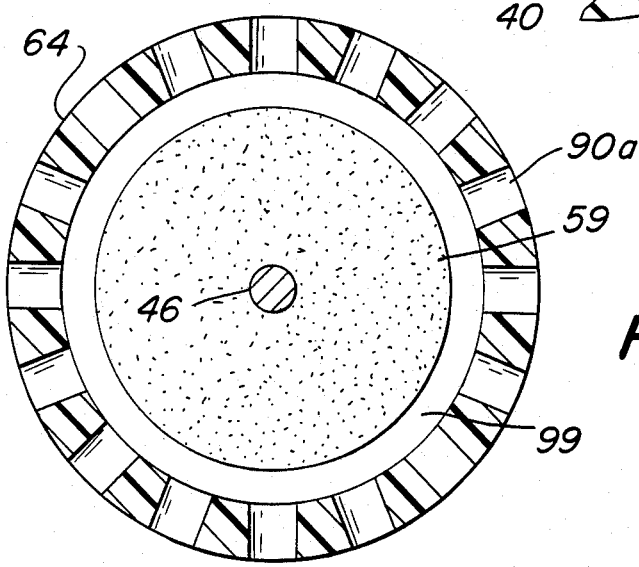
FIG. 11 is a cross sectional view along lines 11—11 FIG. 7.

The monitor assembly 34 using two contrasting colors is positioned upon the lid assembly 52 as previously described and as shown in FIG. 7. The filler assembly 36 consists of a funnel 33 combined with a vertical pipe 64 that is terminated with an enclosing member 90. The vertical pipe 64 is adapted for semi-permanent insertion into fixed pipe 64a and is attached at its collar 57a to an upper flat surface 57 of a reservoir or tank for retaining a fluid 75. The filler assembly 36 is firmly retained upon the fixed pipe 64a by means of a seating collar 55 that includes an annular slit 64b that fits upon the pipe opening 91. Flotation member 59 is attached to the flexible rod 46, which is aligned by guide 92, and to the cylindrical member 38 which floats within the reservoir fluid 75 through the expedient of using perforations 90a formed in the vertical pipe 64 and located in the vicinity of the closing member 90. The cross section view 11—11 of FIG. 7 as shown in FIG. 11 further illustrates how the fluid 75 (not shown) surrounding the vertical pipe 64 communicates through the perforations 90a with the flotation member 59. The member 59 is able to accurately represent the fluid level to the monitoring assembly 34 by readily floating within the volumetric space 99.

This invention has been described by reference to precise embodiments but it will be appreciated by those skilled in the art that this invention is subject to various modifications and to the extent that those modifications would be obvious to one of ordinary skill they are considered as being within the scope of the appended claims.

What is claimed is:

1. A combination for monitoring and filling a reservoir with fluid comprising:
   (a) a circular filler assembly having distal and proximal ends permanently connected to said reservoir through said distal end;
   (b) mean for semi-permanent insertion at said proximal end of said filler into said assembly for forming a passageway to allow fluid to be transferred into said reservoir;
   (c) movable and flexible means located within said passageway to monitor the fluid level within said reservoir, said movable and flexible means further including means for floating upon the surface of said fluid;
   (d) indicator means utilizing contrasting first and second colors for displaying an amount of fluid to maintain said reservoir in a filled level;
   (e) said indicator means being located for easy viewing comprising first and second member: wherein said first member is attached to said movable and flexible means, and said second member being positioned concentrically upon said insertion means for slidable engagement with said first member;
   (f) said indicator means displaying said first color only by means of said first member when said reservoir is in a filled condition, and said indicator means displaying said first color in contrasting arrangement with said second color by means of the slidable engagement of said second member with respect to said first member to indicate a partial depletion of fluid from said reservoir; and
   (g) the length of travel of said movable means through said floating means corresponding to an amount of display of said second color with respect to said first color in accordance with a level/volume ratio of said reservoir, and a greater first and second color contrast indicating a greater depletion of said fluid.

2. The combination in accordance with claim 1 wherein said insertion means is funnel-shaped at the proximal end of said filler.

3. The combination in accordance with claim 1 wherein said first member is of a smaller diameter than said second member.

4. The combination in accordance with claim 3 wherein the second member of said indicator means is located upon said insertion means and is swivable thereon with respect to said first member, said first member being movable in a vertical direction in accordance with a positioning of said floating means upon the reservoir fluid.

5. The combination in accordance with claim 3 wherein
   (a) more than one-half of said second cylindrical member of said indicator means as measured by its diameter is formed from a transparent material; and
   (b) the remainder of said second member is made opaque by means of said second color.

6. The combination in accordance with claim 3 wherein
   (a) said first cylindrical member is formed such that said first color is formed upon its exterior surface; and
   (b) said first and second contrasting colors being observable through said transparent material.

7. The combination in accordance with claim 6 wherein said insertion means includes a hinged lid located upon an uppermost portion of said passageway for maintaining the fluid in said reservoir in a dust-free condition, as well as for allowing fluid to be readily added to said reservoir.

8. The combination in accordance with claim 7 wherein the amount of vertical travel of said floating means is determined by a level/volume ratio of said reservoir.

9. The combination in accordance with claim 8 wherein maximum travel of said floating means is determined by an enclosing member located at a lowermost portion of said passageway.

10. The combination in accordance with claim 9 wherein communication is provided with said reservoir fluid by means of a plurality of perforations located within said passageway and in the vicinity of said enclosing member.

11. The combination in accordance with claim 10 wherein an electrically conductive means is placed upon an uppermost diameter of said first cylindrical member.

12. The combination in accordance with claim 11 which further includes:
 (a) first and second electrical terminal means located along a periphery of said second member for engagement with said electrically conductive means of said first member;
 (b) light means;
 (c) ignition means having an open and closed position;
 (d) energizing means, said first terminal means being serially connected through said light and ignition means and to said second electrical terminal means; and
 (e) whereby when the reservoir is dangerously depleted, electrical contact is made between said first and second terminal means with said electrically conductive means whereby said light means is energized through said closed ignition in order to provide a visual alert signal.

13. A combination for monitoring and filling a reservoir with fluid comprising:
 (a) a filler assembly having distal and proximal ends connected to said reservoir through said distal end, and said proximal end having an entrance for adding fluid to the reservoir;
 (b) means juxtaposed to said entrance for alternatively blocking foreign matter or allowing fluid to be added to said reservoir;
 (c) a monitor assembly for determining the fluid level within said reservoir located upon said juxtaposed means, and comprising a rotatable member in combination with a vertical moving member which rises or falls in accordance with a level/volume ratio of said reservoir;
 (d) said monitoring assembly further comprising a movable and flexible means located within said filler assembly for connecting with said vertical member, and said movable and flexible means further including a means for floating upon the surface of said fluid;
 (e) whereby the variations in the fluid level of said reservoir cause said vertical member to correspondingly travel with respect to said rotatable member in a manner to allow a visual interpretation to be made with respect to a full/depletion level of said reservoir, and said rotatable member being variable through a circular arc to provide improved visability to an operator conducting maintenance.

14. The combination in accordance with claim 13 wherein said rotatable member includes vertically oriented fill markings which are read in conjunction with said vertical moving member to determine the full-depletion level of said reservoir.

15. The combination in accordance with claim 14 wherein said filler assembly comprises an integrally formed funnel and pipe-like member leading into said reservoir.

16. The combination in accordance with claim 15 wherein said rotatable and vertically moving member are respectively distinguished by first and second colors wherein a full condition of the reservoir causes said second color only to be seen by an observer, whereas, a partially depleted reservoir causes said first and second colors to be contrastingly displayed and the amount of depletion is determined by the amount of contrast.

17. The combination in accordance with claim 13 wherein said filler assembly has a constant and circular cross-section.

* * * * *